US010599458B2

(12) United States Patent
Variath et al.

(10) Patent No.: US 10,599,458 B2
(45) Date of Patent: Mar. 24, 2020

(54) FABRIC COMPUTING SYSTEM HAVING AN EMBEDDED SOFTWARE DEFINED NETWORK

(71) Applicants: Ranjith Menon Puthen Variath, Bangalore Karnataka (IN); James R Hunter, Jr., Chadds Ford, PA (US); John A Landis, Pipersville, PA (US)

(72) Inventors: Ranjith Menon Puthen Variath, Bangalore Karnataka (IN); James R Hunter, Jr., Chadds Ford, PA (US); John A Landis, Pipersville, PA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 14/603,496

(22) Filed: Jan. 23, 2015

(65) Prior Publication Data

US 2016/0216982 A1   Jul. 28, 2016

(51) Int. Cl.
| | |
|---|---|
| *G06F 15/177* | (2006.01) |
| *G06F 9/455* | (2018.01) |
| *G06F 9/50* | (2006.01) |
| *H04L 12/46* | (2006.01) |
| *H04L 12/715* | (2013.01) |

(52) U.S. Cl.
CPC ........ *G06F 9/45558* (2013.01); *G06F 9/5077* (2013.01); *G06F 2009/45583* (2013.01); *G06F 2009/45595* (2013.01); *H04L 12/4641* (2013.01); *H04L 45/64* (2013.01)

(58) Field of Classification Search
CPC . G06F 9/45558; G06F 9/5077; H04L 12/4641

USPC ......................................................... 709/220
See application file for complete search history.

(56) References Cited

U.S. PATENT DOCUMENTS

| | | | | |
|---|---|---|---|---|
| 2007/0061441 | A1* | 3/2007 | Landis .................. | G06F 9/5077 709/224 |
| 2008/0163207 | A1* | 7/2008 | Reumann ............ | H04L 63/0263 718/1 |
| 2009/0118839 | A1* | 5/2009 | Accapadi ................ | G06F 21/53 700/28 |

(Continued)

*Primary Examiner* — Umar Cheema
*Assistant Examiner* — Hannah S Wang

(57) ABSTRACT

A Forward Fabric platform system for coupling to a data center platform. The Forward Fabric platform system includes a plurality of nodes, an interconnect backplane coupled between the nodes, and a Forward Fabric Manager (FFM) coupled to the nodes via the interconnect backplane for controlling and managing the Forward Fabric platform system. The Forward Fabric manager creates at least one secure partition (s-Par) application executing within at least one of the nodes. At least one of the nodes having a secure partition (s-Par) application executing therein also includes a software defined network (SDN) controller executing therein for receiving configuration information and providing at least one secure and non-stop Forward Fabric endpoint on the Forward Fabric platform system for connecting with at least one endpoint on the data center platform. At least one of the nodes having a secure partition (s-Par) application executing therein also includes a traffic control component and a router switch component. At least one the nodes is coupled to the data center platform via one or more non-stop fabric segments.

20 Claims, 7 Drawing Sheets

(56) References Cited

U.S. PATENT DOCUMENTS

| | | | | |
|---|---|---|---|---|
| 2010/0161872 A1* | 6/2010 | Daniel | ................ | G06F 13/385 |
| | | | | 710/316 |
| 2015/0089331 A1* | 3/2015 | Skerry | ................ | G06F 9/45533 |
| | | | | 714/799 |
| 2015/0370586 A1* | 12/2015 | Cooper | ............... | G06F 9/45533 |
| | | | | 710/308 |
| 2016/0164835 A1* | 6/2016 | Hoffmann | ........... | H04L 63/0272 |
| | | | | 726/1 |
| 2016/0170667 A1* | 6/2016 | McBrearty | ............ | G06F 3/0619 |
| | | | | 711/162 |

* cited by examiner

FABRIC COMPUTING SYSTEM HAVING AN EMBEDDED SOFTWARE DEFINED NETWORK

BACKGROUND

Field

The instant disclosure relates to fabric computing systems, and in particular to standalone fabric computing platforms.

Description of the Related Art

Computer system virtualization allows multiple operating systems and processes to share the hardware resources of a host computer. Ideally, system virtualization provides resource isolation so that each operating system does not realize that it is sharing resources with another operating system and does not adversely affect the execution of the other operating system(s). Such system virtualization enables applications including server consolidation, co-located hosting facilities, distributed web services, applications mobility, secure computing platforms, and other applications that provide for efficient use of underlying hardware resources.

Many conventional virtualization systems are architected as a monolithic virtualization software system that hosts each virtualized system. That is, such virtualization systems are constructed to host each of the virtualized systems on a particular computing platform. As such, the virtualization systems or virtual machine monitors (VMMs) associate hardware resources of a particular platform with each partition. Typically, this involves sharing of resources across multiple partitions. For example, two partitions may share a same processor and memory resource, although the partitions may be separated by address ranges or otherwise maintained to ensure isolated memory management. Furthermore, two such partitions may also share input/output devices, such as keyboards, mice, printing ports, Ethernet ports, or other communications interfaces.

However, in many of these conventional virtualization systems, e.g., where partitions are able to intercommunicate, such partitions may not have adequate security with respect to other partitions or systems that are within the same fabric, but which should not necessarily be authorized to intercommunicate.

To address this issue and other issues, securely partitioned (s-Par®) virtualization systems have been developed. In addition to enhanced partition security, such securely partitioned virtualization systems have dedicated physical resources for each partition. Securely partitioned virtualization systems also have been developed that can be executed using a Forward Fabric architecture. A Forward Fabric architecture allows applications and/or services to run across multiple operating systems instantiations that may exist within single or multiple platforms.

Conventional securely partitioned virtualization systems use various network cards (NICs) and host bus adapters (HBAs) on the physical host computing system to assign each partition in the securely partitioned virtualization system an interface, e.g., an interface to a data center or a local area network (LAN). Therefore, a sufficient number of network cards and host bus adapters are needed to meet the needs of the multiple partitions. Accordingly, a sufficient number of cables likewise are needed.

SUMMARY

Disclosed is a Forward Fabric platform system for coupling to a data center platform. The Forward Fabric platform system includes a plurality of nodes, an interconnect backplane coupled between the nodes, and a Forward Fabric Manager (FFM) coupled to the nodes via the interconnect backplane for controlling and managing the Forward Fabric platform system. The Forward Fabric manager creates at least one secure partition (s-Par) application executing within at least one of the nodes. At least one of the nodes having a secure partition (s-Par) application executing therein also includes a software defined network (SDN) controller executing therein for receiving configuration information and providing at least one secure and non-stop Forward Fabric endpoint on the Forward Fabric platform system for connecting with at least one endpoint on the data center platform. At least one of the nodes having a secure partition (s-Par) application executing therein also includes a traffic control component and a router switch component. At least one the nodes is coupled to the data center platform via one or more non-stop fabric segments.

DETAILED DESCRIPTION

Figure 1:
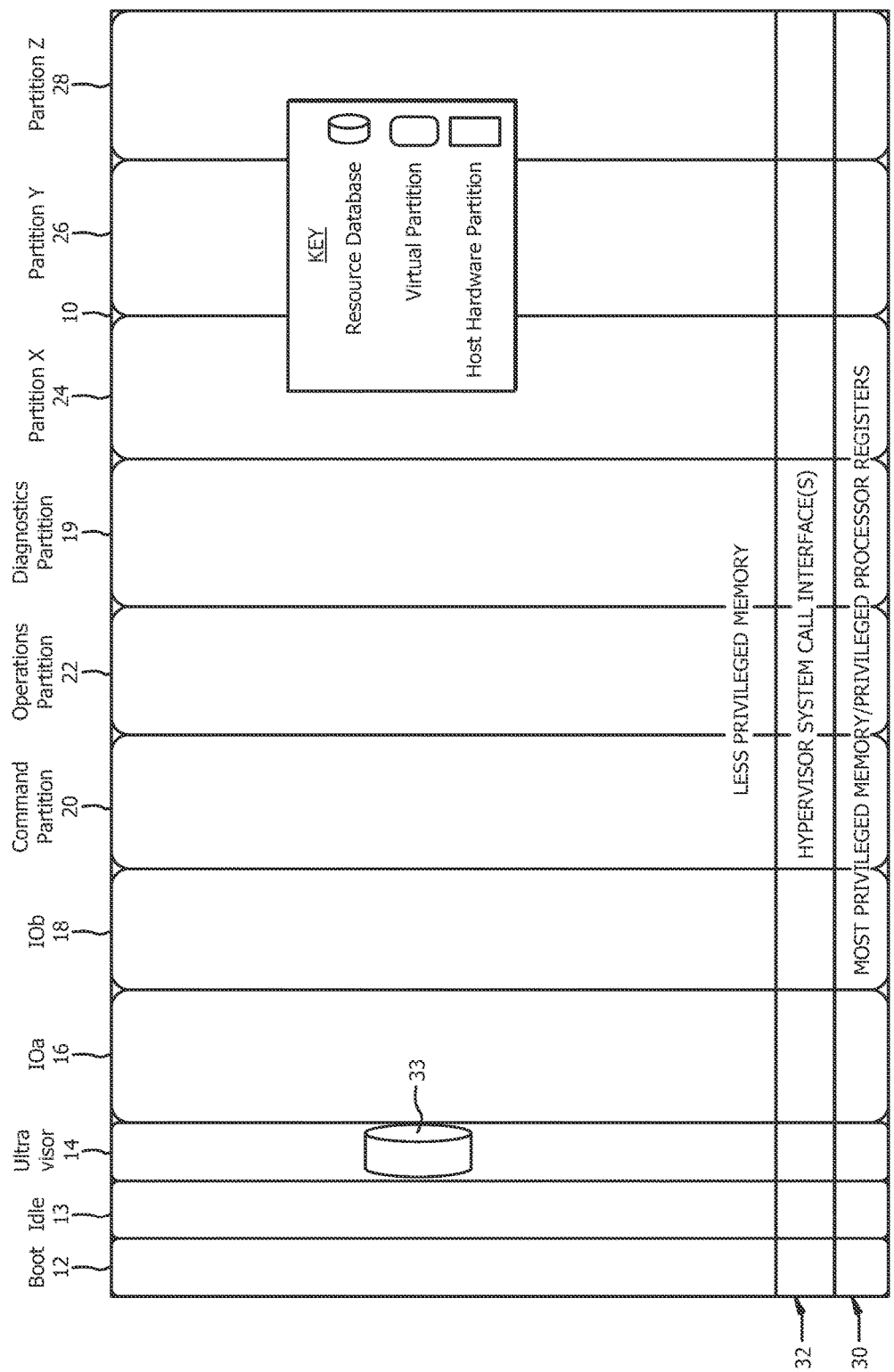
FIG. 1 is a schematic view of a host system partitioned using a para-virtualization system, illustrating system infrastructure partitions, according to an embodiment.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general, embodiments of the present disclosure are directed to Forward Fabric systems and methods having an embedded software defined network in the Forward Fabric platform. The embedded software defined network eliminates the need for network cards, host bus adapters and network patch cables for interfacing each of the secure partitions in the Forward Fabric platform with partitions in the data center platform.

In the context of the present disclosure, virtualization software generally corresponds to software that executes natively on a computing system, through which non-native software can be executed by hosting that software with the virtualization software exposing those native resources in a way that is recognizable to the non-native software. By way of reference, non-native software, otherwise referred to herein as "virtualized software" or a "virtualized system", refers to software not natively executable on a particular hardware system, for example due to it being written for execution by a different type of microprocessor configured to execute a different native instruction set.

In some of the examples discussed herein, the native software set can be the x86-32, x86-64, or IA64 instruction set from Intel Corporation of Sunnyvale, Calif., while the non-native or virtualized system might be compiled for execution on an OS2200 system from Unisys Corporation of Blue Bell, Pa. However, it is understood that the principles of the present disclosure are not thereby limited.

In general, and as further discussed below, the present disclosure provides virtualization infrastructure that allows multiple virtual guest partitions to run within a corresponding set of host hardware partitions. By judicious use of correspondence between hardware and software resources, it is recognized that the present disclosure allows for improved performance and reliability by dedicating hardware resources to that particular partition. When a partition requires service (e.g., in the event of an interrupt or other issues which indicate a requirement of service by virtualization software), overhead during context switching is largely avoided, since resources are not used by multiple partitions. When the partition fails, those resources associated with a partition may identify the system state of the partition to allow for recovery. Furthermore, due to a distributed architecture of the virtualization software as described herein, continuous operation of virtualized software can be accomplished.

FIG. 1 shows an example arrangement of a para-virtualization system that can be used to accomplish the features described herein. In some embodiments, the architecture discussed herein uses the principle of least privilege to run code at the lowest practical privilege. To do this, special infrastructure partitions run resource management and physical I/O device drivers. FIG. 1 illustrates system infrastructure partitions on the left and user guest partitions on the right. Host hardware resource management runs as an ultravisor application in a special ultravisor partition. This ultravisor application implements a server for a command channel to accept transactional requests for assignment of resources to partitions. The ultravisor application maintains the master in-memory database of the hardware resource allocations. The ultravisor application also provides a read only view of individual partitions to the associated partition monitors.

In FIG. 1, a partitioned host (hardware) system (or node) 10 has lesser privileged memory that is divided into distinct partitions, including special infrastructure partitions, such as a boot partition 12, an idle partition 13, a resource management "ultravisor" partition 14, a first input/output (I/O) virtual machine (IOVM) partition 16, a second IOVM partition 18, a command partition 20, an operations partition 22, and a diagnostics partition 19, as well as virtual guest partitions (e.g., a virtual guest partition X 24, a virtual guest partition Y 26, and a virtual guest partition Z 28). As illustrated, the partitions 12-28 do not access the underlying privileged memory and processor registers 30 directly, but instead accesses the privileged memory and processor registers 30 via a hypervisor system call interface 32 that provides context switches among the partitions 12-28, e.g., in a conventional manner. However, unlike conventional virtual machine monitors (VMMs) and hypervisors, the resource management functions of the partitioned host system 10 of FIG. 1 are implemented in the special infrastructure partitions 12-22.

Furthermore, rather than requiring the re-write of portions of the guest operating system, drivers can be provided in the guest operating system environments that can execute system calls. As explained in further detail in U.S. Pat. No. 7,984,104, assigned to Unisys Corporation of Blue Bell, Pa., these special infrastructure partitions 12-22 control resource management and physical I/O device drivers that are, in turn, used by operating systems operating as guests in the virtual guest partitions 24-28. Of course, many other virtual guest partitions may be implemented in a particular partitioned host system 10 in accordance with the techniques of the present disclosure.

A boot partition 12 contains the host boot firmware and functions to initially load the ultravisor partition 14, the IOVM partitions 16 and 18, and the command partition 20. Once launched, the ultravisor partition 14 includes minimal firmware that tracks resource usage using a tracking application referred to herein as an ultravisor or resource management application. Host resource management decisions are performed in the command partition 20, and distributed decisions among partitions in the host partitioned system 10 are managed by the operations partition 22. The diagnostics partition 19 is responsible for handling diagnostics logs and dumps.

The I/O to disk drive operations and similar I/O operations are controlled by one or both of the IOVM partitions 16 and 18 to provide both failover and load balancing capabilities. Operating systems in the virtual guest partitions 24, 26, and 28 communicate with the IOVM partitions 16 and 18 via memory channels (FIG. 3) established by the ultravisor partition 14. The partitions communicate only via the memory channels. Hardware I/O resources are allocated only to the IOVM partitions 16, 18. In the configuration of FIG. 1, the hypervisor system call interface 32 functions as a context switching and containment element (monitor) for the respective partitions.

Figure 2:
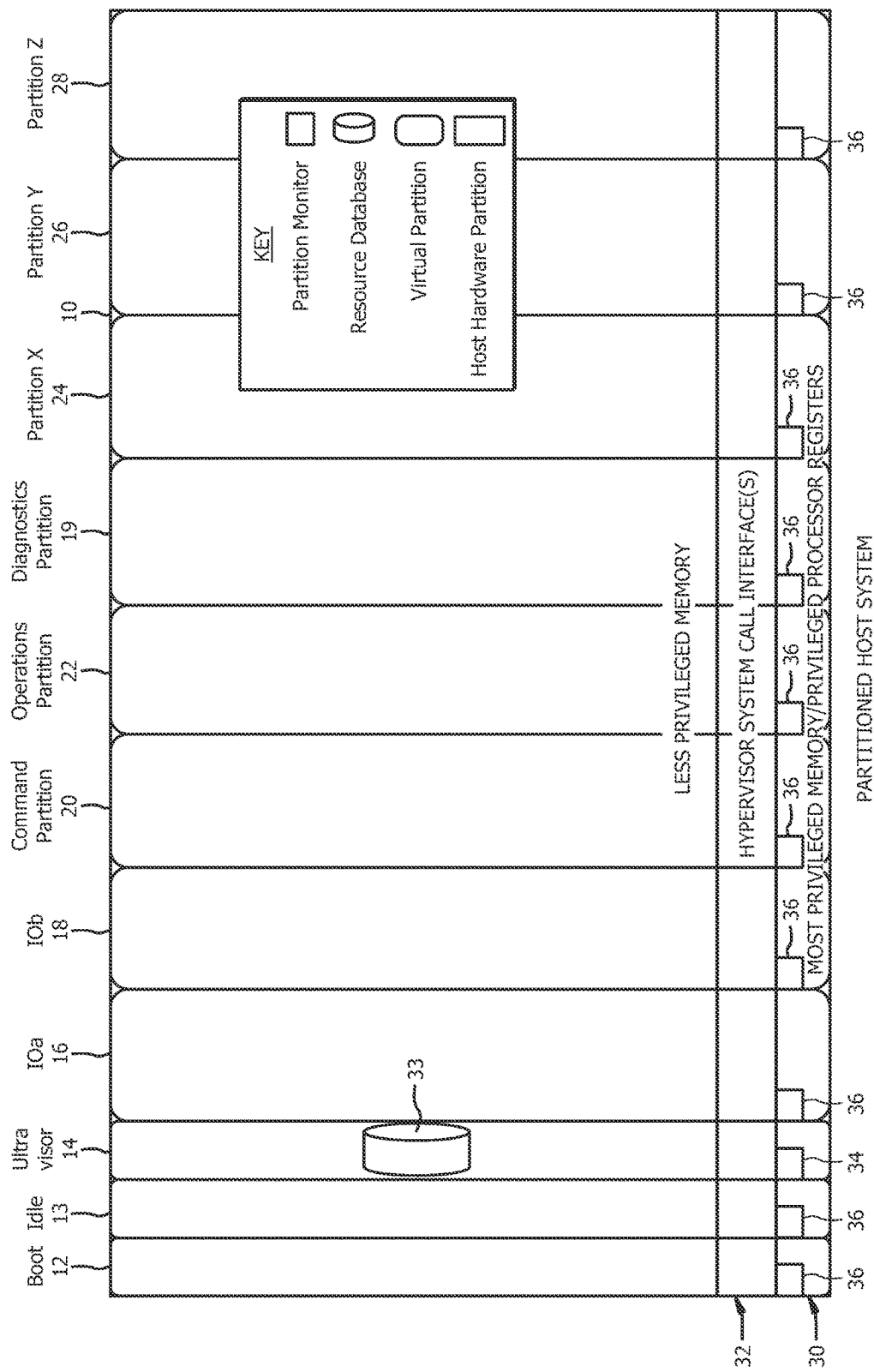
FIG. 2 is a schematic view of the host system of FIG. 1, illustrating the partitioned host system of FIG. 1 and the associated partition monitors of each partition, according to an embodiment.
Figure 3:
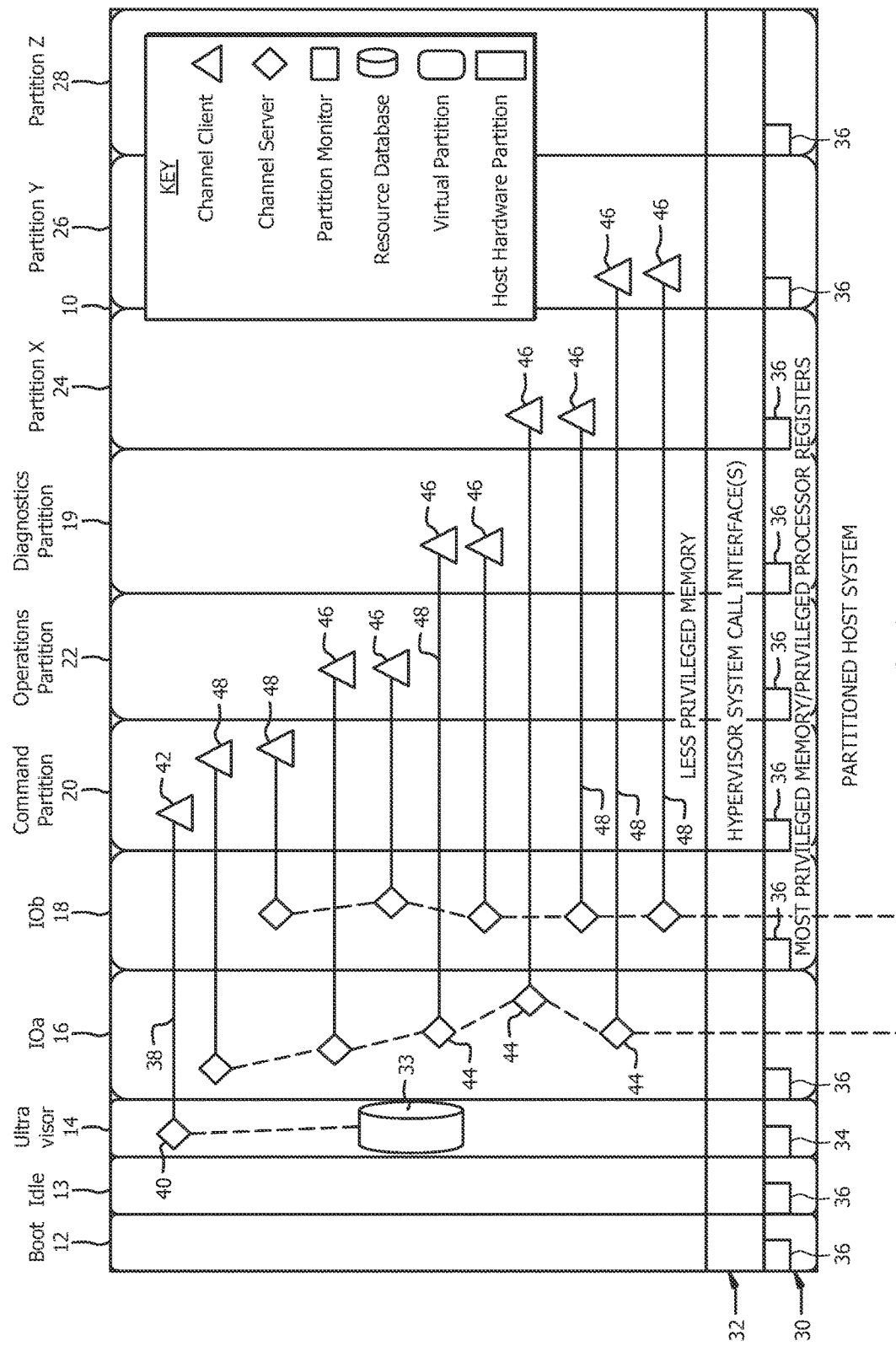
FIG. 3 is a schematic view of the host system of FIG. 1, illustrating memory mapped communication channels amongst various partitions of the para-virtualization system of FIG. 1, according to an embodiment.

The resource manager application of the ultravisor partition 14, shown as application 40 in FIG. 3, manages a resource database 33 that keeps track of the assignment of resources to partitions, and further serves a command channel 38 to accept transactional requests for assignment of the resources to respective partitions. As illustrated in FIG. 2, the ultravisor partition 14 also includes a partition (lead) monitor 34 that is similar to a virtual machine monitor (VMM), except that the partition monitor 34 provides individual read-only views of the resource database 33 in the ultravisor partition 14 to associated partition monitors 36 of each partition. Thus, unlike conventional VMMs, each partition has its own monitor instance 36 such that failure of the monitor 36 does not bring down the entire host partitioned system 10.

As will be explained below, the guest operating systems in the respective virtual guest partitions 24, 26, 28 can be modified to access the associated partition monitors 36 that implement together with the hypervisor system call interface 32 a communications mechanism through which the ultravisor partition 14, the IOVM partitions 16 and 18, and any other special infrastructure partitions may initiate communications with each other and with the respective virtual guest partitions. However, to implement this functionality, those skilled in the art will appreciate that the guest operating systems in the virtual guest partitions 24, 26, 28 can be modified so that the guest operating systems do not attempt to use the "broken" instructions in the x86 system that complete virtualization systems must resolve by inserting traps.

Basically, the approximately 17 "sensitive" IA-32 instructions (those that are not privileged but that yield information about the privilege level or other information about actual hardware usage that differs from that expected by a guest OS) are defined as "undefined," and any attempt to run an unaware OS at other than ring zero likely will cause the OS to fail but will not jeopardize other partitions. Such "paravirtualization" requires modification of a relatively few lines of operating system code while significantly increasing system security by removing many opportunities for hacking into the kernel via the "broken" ("sensitive") instructions. Those skilled in the art will appreciate that the partition monitors 36 could instead implement a "scan and fix" operation whereby runtime intervention is used to provide an emulated value rather than the actual value by locating the sensitive instructions and inserting the appropriate interventions.

The partition monitors 36 in each partition constrain the guest OS and its applications to the assigned resources. Each monitor 36 implements a system call interface 32 that is used by the guest OS of its partition to request usage of allocated resources. The system call interface 32 includes protection exceptions that occur when the guest OS attempts to use privileged processor op-codes. Different partitions can use different monitors 36, which allows the support of multiple system call interfaces 32 and for these standards to evolve over time. Different partitions using different monitors 36 also allows the independent upgrade of monitor components in different partitions.

The monitor 36 preferably is aware of processor capabilities so that the monitor 36 may be optimized to use any available processor virtualization support. With appropriate monitor 36 and processor support, a guest OS in a virtual guest partition (e.g., virtual guest partitions 24-28) need not be aware of the ultravisor system of the invention and need not make any explicit "system" calls to the monitor 36. In this case, processor virtualization interrupts provide the necessary and sufficient system call interface 32. However, to improve performance, explicit calls from a guest OS to a monitor system call interface 32 still are desirable.

The monitor 36 also maintains a map of resources allocated to the partition it monitors, and ensures that the guest OS (and applications) in its partition use only the allocated hardware resources. The monitor 36 can do this because the monitor 36 is the first code running in the partition at the processor's most privileged level. The monitor 36 boots the partition firmware at a decreased privilege. The firmware subsequently boots the OS and applications. Normal processor protection mechanisms prevent the firmware, the OS, and the applications from obtaining the processor's most privileged protection level.

Unlike a conventional VMM, the monitor 36 has no I/O interfaces. All I/O operations are performed by I/O hardware mapped to the IOVM partitions 16 and 18, which use memory channels to communicate with their client partitions. Instead, the primary responsibility of the monitor 36 is to protect processor provided resources (e.g., processor privileged functions and memory management units). The monitor 36 also protects access to I/O hardware primarily through protection of memory mapped I/O operations. The monitor 36 further provides channel endpoint capabilities, which are the basis for I/O capabilities between virtual guest partitions.

The monitor 34 for the ultravisor partition 14 is a "lead" monitor with two special roles. First, the monitor 34 creates and destroys monitor instances 36. Second, the monitor 34 provides services to the created monitor instances 36 to aid processor context switches. During a processor context switch, the monitors 34 and monitor instances 36 save the virtual guest partition state in the virtual processor structure, save the privileged state in the virtual processor structure (e.g. IDTR, GDTR, LDTR, CR3), and then invoke the ultravisor monitor switch service. The ultravisor monitor switch service loads the privileged state of the target partition monitor (e.g., IDTR, GDTR, LDTR, CR3) and switches to the target partition monitor, which then restores the remainder of the virtual guest partition state.

The most privileged processor level (i.e., x86 ring 0) is retained by having the monitor instance 36 running below the system call interface 32. This retention is more effective if the processor implements at least three distinct protection levels (e.g., x86 ring 1, 2, and 3) available to the guest OS and applications. The x86 processor virtualization (as described hereinabove) provides x86 root rings 0-3 for the monitor use, allowing the guest to use all four of the non-root rings 0-3. The ultravisor partition 14 connects to the monitors 34 and monitor instances 36 at the base (most privileged level) of each partition. The monitor 34 grants itself read only access to the partition descriptor in the ultravisor partition 14, and the ultravisor partition 14 has read only access to one page of the monitor state stored in the resource database 33.

Those skilled in the art will appreciate that the monitors 34 and monitor instances 36 of the invention are similar to a conventional VMM in that they constrain the partition to its assigned resources, the interrupt handlers provide protection exceptions that emulate privileged behaviors as necessary, and system call interfaces are implemented for "aware" contained system code. However, as explained in further detail below, the monitors 34 and monitor instances 36 of the invention are unlike a conventional VMM in that the master resource database 33 is contained in a virtual (ultravisor) partition for recoverability, the resource database 33 implements a simple transaction mechanism, and the virtualized system is constructed from a collection of cooperating monitors 34 and monitor instances 36 whereby a failure in one monitor 34 or monitor instance 36 need not doom all partitions (only containment failure that leaks out does). As such, as discussed below, failure of a single physical processing unit need not doom all partitions of a system, because partitions are affiliated with different processing units.

The monitors 34 and monitor instances 36 of the invention are also different from conventional VMMs in that each partition is contained by its assigned monitor, partitions with simpler containment requirements can use simpler and thus more reliable (and higher security) monitor implementations, and the monitor implementations for different partitions may, but need not be, shared. Also, unlike conventional VMMs, the lead monitor 34 provides access by other monitor instances 36 to the ultravisor partition resource database 33.

Partitions in the ultravisor environment include the available resources organized by the host node 10. A partition is a software construct (that may be partially hardware assisted) that allows a hardware system platform (or hardware partition) to be "partitioned" into independent operating environments. The degree of hardware assist is platform dependent but, by definition, is less than 100% (because, by definition, a 100% hardware assist provides hardware partitions). The hardware assist may be provided by the processor or other platform hardware features. From the perspective of the ultravisor partition 14, a hardware partition generally is indistinguishable from a commodity hardware platform without partitioning hardware.

Unused physical processors are assigned to a special "idle" partition 13. The idle partition 13 is the simplest partition that is assigned processor resources. The idle partition 13 contains a virtual processor for each available physical processor, and each virtual processor executes an idle loop that contains appropriate processor instructions to reduce processor power usage. The idle virtual processors may cede time at the next ultravisor time quantum interrupt, and the monitor 36 of the idle partition 13 may switch processor context to a virtual processor in a different partition. During host bootstrap, the boot processor of the boot partition 12 boots all of the other processors into the idle partition 13.

In some embodiments, multiple ultravisor partitions 14 also are possible for large host partitions, to avoid a single point of failure. Each ultravisor partition 14 would be responsible for resources of the appropriate portion of the host system 10. Resource service allocations would be partitioned in each portion of the host system 10. This allows clusters to run within a host system 10 (one cluster node in each zone), and still survive failure of an ultravisor partition 14.

As illustrated in FIGS. 1-3, each page of memory in an ultravisor enabled host system 10 is owned by one of its partitions. Additionally, each hardware I/O device is mapped to one of the designated IOVM partitions 16, 18. These IOVM partitions 16, 18 (typically two for redundancy) run special software that allows the IOVM partitions 16, 18 to run the I/O channel server applications for sharing the I/O hardware. Alternatively, for non-IOVM partitions executing using a processor implementing Intel's VT-d technology, devices can be assigned directly to non-IOVM partitions. Irrespective of the manner of association, such channel server applications include a virtual Ethernet switch (which provides channel server endpoints for network channels) and a virtual storage switch (which provides channel server endpoints for storage channels). Unused memory and I/O resources are owned by a special "available" pseudo partition (not shown in the figures). One such "available" pseudo partition per node of host system 10 owns all resources available for allocation.

Referring to FIG. 3, virtual channels are the mechanisms used in accordance with the invention to connect to zones and to provide relatively fast, safe, recoverable communications among the partitions. For example, virtual channels provide a mechanism for general I/O and special purpose client/server data communication between the virtual guest partitions 24, 26, 28 and the IOVM partitions 16, 18 in the same host 10. Each virtual channel provides a command and I/O queue (e.g., a page of shared memory) between two partitions. The memory for a channel is allocated and "owned" by the virtual guest partition 24, 26, 28. The ultravisor partition 14 maps the channel portion of client memory into the virtual memory space of the attached server partition. The ultravisor application tracks channels with active servers to protect memory during teardown of the owner virtual guest partition until after the server partition is disconnected from each channel. Virtual channels can be used for command, control, and boot mechanisms, as well as for traditional network and storage I/O.

As shown in FIG. 3, the ultravisor partition 14 has a channel server 40 that communicates with a channel client 42 of the command partition 20 to create the command channel 38. The IOVM partitions 16, 18 also include channel servers 44 for each of the virtual devices accessible by channel clients 46. Within each virtual guest partition 24, 26, 28, a channel bus driver enumerates the virtual devices, where each virtual device is a client of a virtual channel. The dotted lines in IOVMa partition 16 represent the interconnects of memory channels from the command partition 20 and operations partitions 22 to the virtual Ethernet switch in the IOVMa partition 16 that may also provide a physical connection to the appropriate network zone. The dotted lines in IOVMb partition 18 represent the interconnections to a virtual storage switch. Redundant connections to the virtual Ethernet switch and virtual storage switches are not shown in FIG. 3. A dotted line in the ultravisor partition 14 from the command channel server 40 to the transactional resource database 33 shows the command channel connection to the transactional resource database 33.

A firmware channel bus (not shown) enumerates virtual boot devices. A separate bus driver tailored to the operating system enumerates these boot devices, as well as runtime only devices. Except for the IOVM virtual partitions 16, 18, no PCI bus is present in the virtual partitions. This reduces complexity and increases the reliability of all other virtual partitions.

Virtual device drivers manage each virtual device. Virtual firmware implementations are provided for the boot devices, and operating system drivers are provided for runtime devices. Virtual device drivers also may be used to access shared memory devices and to create a shared memory interconnect between two or more virtual guest partitions. The device drivers convert device requests into channel commands appropriate for the virtual device type.

In the case of a multi-processor host 10, all memory channels 48 are served by other virtual partitions. This helps to reduce the size and complexity of the hypervisor system call interface 32. For example, a context switch is not required between the channel client 46 and the channel server 44 of the IOVM partition 16 because the virtual partition serving the channels typically is active on a dedicated physical processor.

Additional details regarding possible implementations of an ultravisor arrangement are discussed in U.S. Pat. No. 7,984,104, assigned to Unisys Corporation of Blue Bell, Pa., the disclosure of which is hereby incorporated by reference in its entirety.

According to a further embodiment, for enhanced security, an embedded version of the secure partition tool and architecture described hereinabove (generally referred to as secure-partition, or s-Par) is used. As described hereinabove, the s-Par secure partition architecture includes a virtualization ultraboot application and a number of service partitions. The virtualization ultraboot application, which is a Unified Extensible Firmware Interface (UEFI) application, is responsible for bootstrapping the secure partition tool. The Unified Extensible Firmware Interface is an interface between an operating system and platform firmware.

Figure 4:
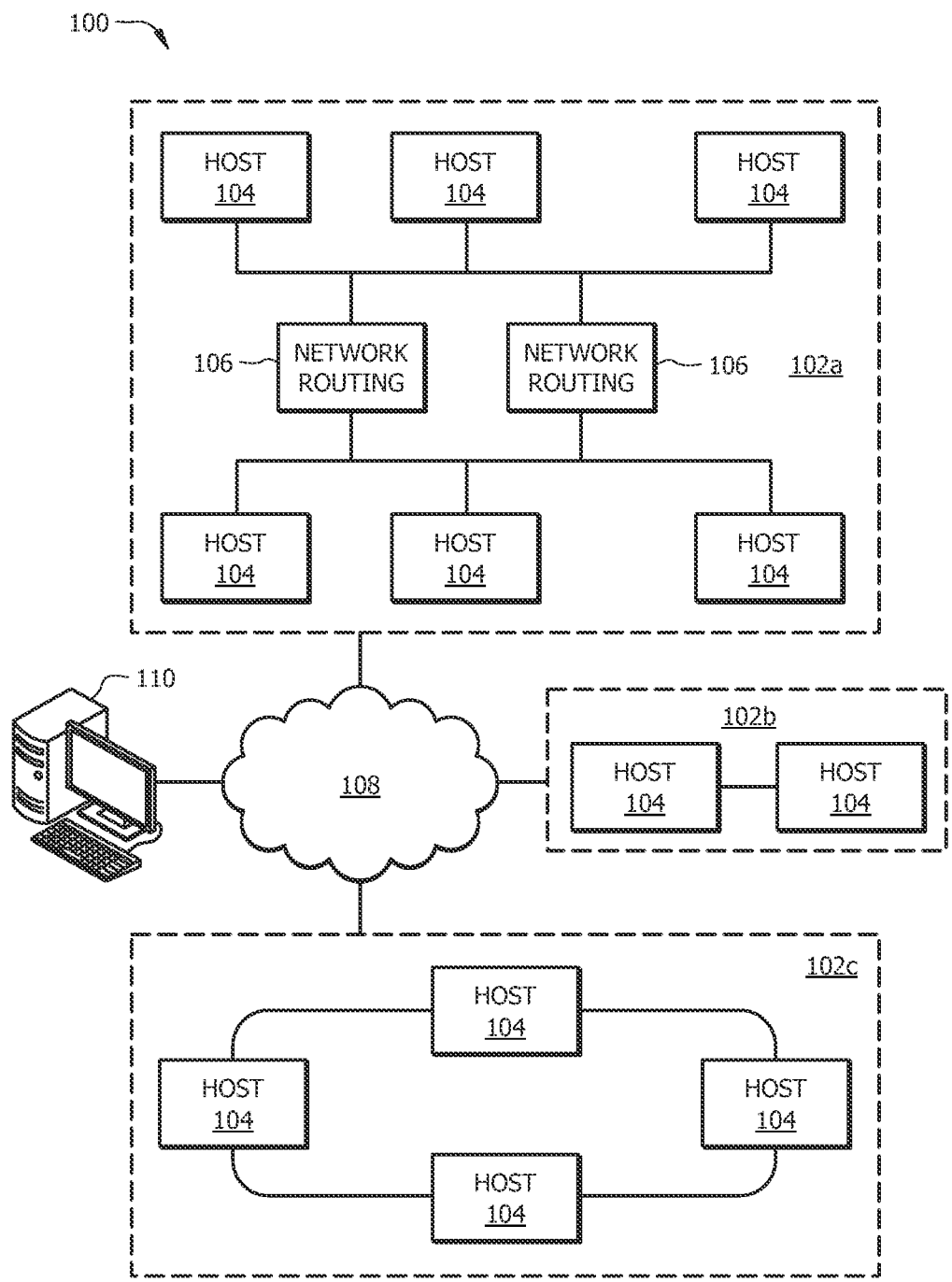
FIG. 4 is a schematic view of a distributed multi-host system, according to an embodiment.

FIG. 4 is a schematic view of a distributed multi-host system 100, in which an example arrangement of computing resources are illustrated for establishing a para-virtualization system across a plurality of host computing systems, such as host computing systems 10 of FIGS. 1-3, according to an embodiment. In particular, FIG. 4 illustrates example computing resources in which the para-virtualization systems described herein can be implemented.

The multi-host system 100 is distributed across one or more locations 102, shown as locations 102a-c. These locations can correspond to locations remote from each other, such as a data center owned or controlled by an organization, a third-party managed computing cluster used in a "cloud" computing arrangement, or other local or remote computing resources residing within a trusted grouping. The locations 102a-c each can include one or more host systems 104. The host systems 104 represent host computing systems, and can take any of a number of forms. For example, the host systems 104 can be server computing systems having one or more processing cores and memory subsystems, and are useable for large-scale computing tasks.

A location 102 within the system 100 can be organized in a variety of ways. For example, a first location 102a can include network routing equipment 106, which routes communication traffic among the various hosts 104, e.g., in a switched network configuration. The second location 102b illustrates a peer-to-peer arrangement of host systems. The third location 102c illustrates a ring arrangement in which messages and/or data can be passed among the host computing systems themselves, which provide the routing of messages. Other types of networked arrangements can be used as well.

At each location 102, the host systems 104 are interconnected by a high-speed, high-bandwidth interconnect, thereby minimizing latency due to data transfers between host systems. The interconnect can be provided by an Infiniband switched fabric communications link. Alternatively, other types of interconnect technologies, such as Fibre Channel, PCI Express, Serial ATA, or other interconnect can be used.

Among the locations 102a-c, a variety of communication technologies can be used to provide communicative connections of host systems 104 at different locations. For example, a packet-switched networking arrangement, such as via the Internet 108, can be used. Preferably, the interconnections among locations 102a-c are provided on a high-bandwidth connection, such as a fiber optic communication connection.

The various host systems 104 at locations 102a-c can be accessed by a client computing system 110. The client computing system 110 can be any of a variety of desktop or mobile computing systems, such as a desktop, laptop, tablet, smartphone, or other type of user computing system. Alternatively, the client computing system 110 can correspond to a server not forming a cooperative part of the para-virtualization system described herein, but rather a server that accesses data hosted on such a system. It should be noted that various virtualized partitions within a para-virtualization system can also host applications accessible to a user and correspond to client systems as well.

It is noted that different arrangements of host systems 104 within the overall system 100 can be used. For example, different host systems 104 may have different numbers or types of processing cores, and different capacity and type of memory and/or caching subsystems can be implemented in different host systems 104. Furthermore, one or more different types of communicative interconnect technologies can be used in the different locations 102a-c, or within a particular location 102.

Figure 5:
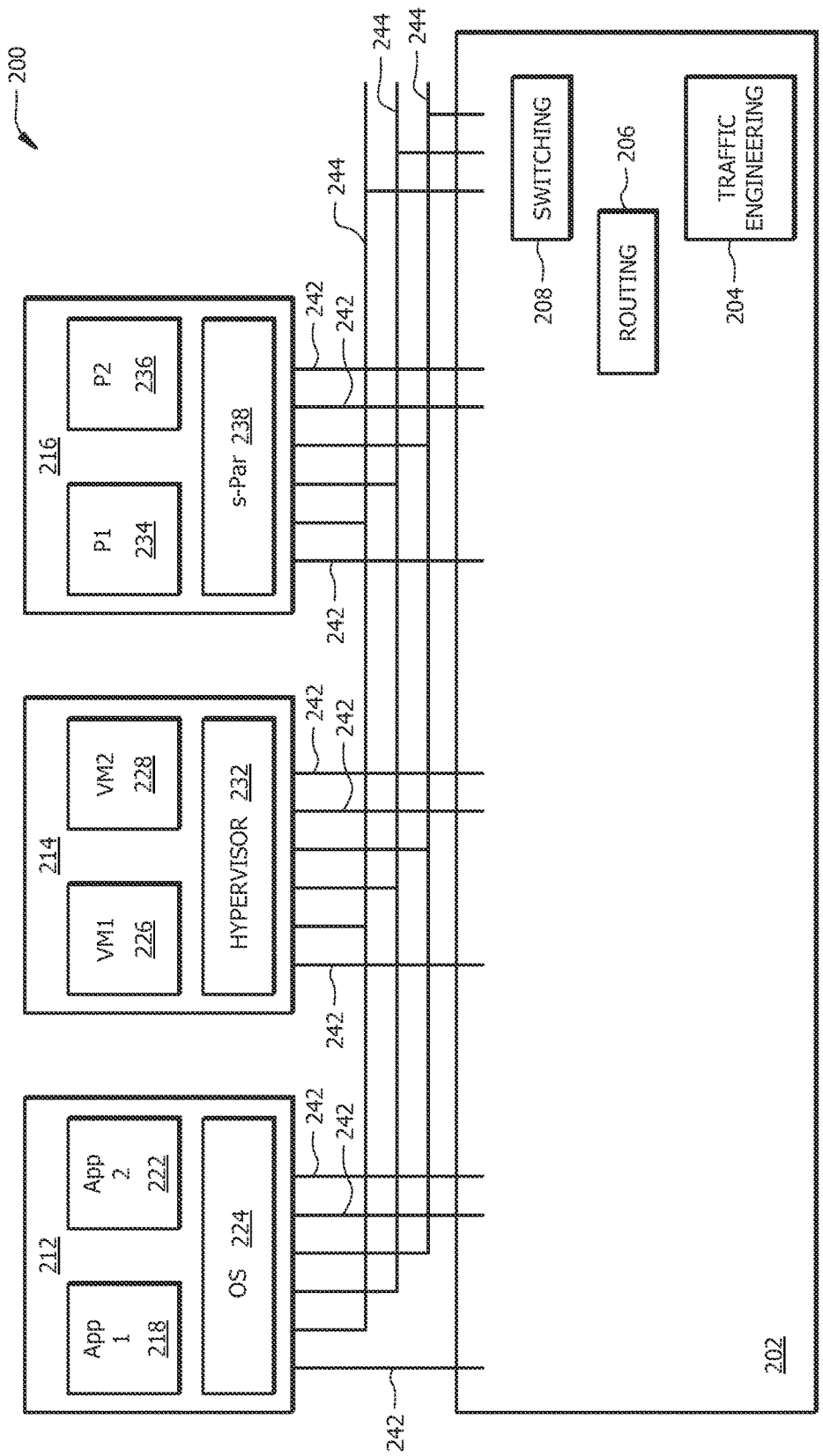
FIG. 5 is a schematic view of a conventional data center.

FIG. 5 is a schematic view of a conventional data center architecture 200. The data center architecture 200 includes a data center platform 202, which includes the appropriate traffic engineering 204, routing 206 and switching 208 components or systems for proper operation of the data center platform 202. The data center platform 202 typically is coupled to an appropriate local area network (LAN) (not shown).

Coupled to the data center platform 202 can be one or more nodes, e.g., a first node 212, a second node 214 and a third node 216. Each of the nodes can include one or more application, operating systems, virtual machines, hypervisor applications and secure partition applications installed and/or running therein. For example, the first node 212 can include a first application 218, a second application 222 and an operating system 224 installed and/or running therein. Also, the second node 214 can include a first virtual machine (VM1) 226, a second virtual machine (VM2) 228 and a hypervisor application 232 installed and/or running therein. Also, the third node 216 can include a first partition (P1) 234, a second partition (P2) 236 and a secure partition (s-Par) application or platform 238 installed and/or running therein. It should be understood that one or more of the first, second and third nodes can have installed and/or running therein any one or more of the applications, operating systems, virtual machines, hypervisors, platforms and secure partition (s-Par) applications shown.

For proper operation of a conventional data center architecture 200, each of the nodes 212, 214, 216 uses various network cards (e.g., virtual NICs) and host bus adapter cards (e.g., HBAs) to assign each of the applications, virtual machines, hypervisors, platforms and secure partition (s-Par) applications installed and/or running therein an interface or connection (shown as 242) to the data center platform 202. Also, each of the nodes 212, 214, 216 uses various network cards (e.g., virtual NICs) and host bus adapter cards (e.g., HBAs) to assign each of the applications, virtual machines, hypervisors, platforms and secure partition (s-Par) applications installed and/or running therein an interface or connection (shown as 244) to one or more of the applications, virtual machines, hypervisors, platforms and secure partition (s-Par) applications installed and/or running in the other platforms.

As discussed hereinabove, in a conventional data center architecture 200, there needs to be a sufficient number of NICs and HBAs to cater to the needs of each application, virtual machine, hypervisor, platform and secure partition (s-Par) application installed and/or running in the respective node. Accordingly, the number of network cables for the various interfaces or connections increases as the number of systems within each node increases.

Figure 6:
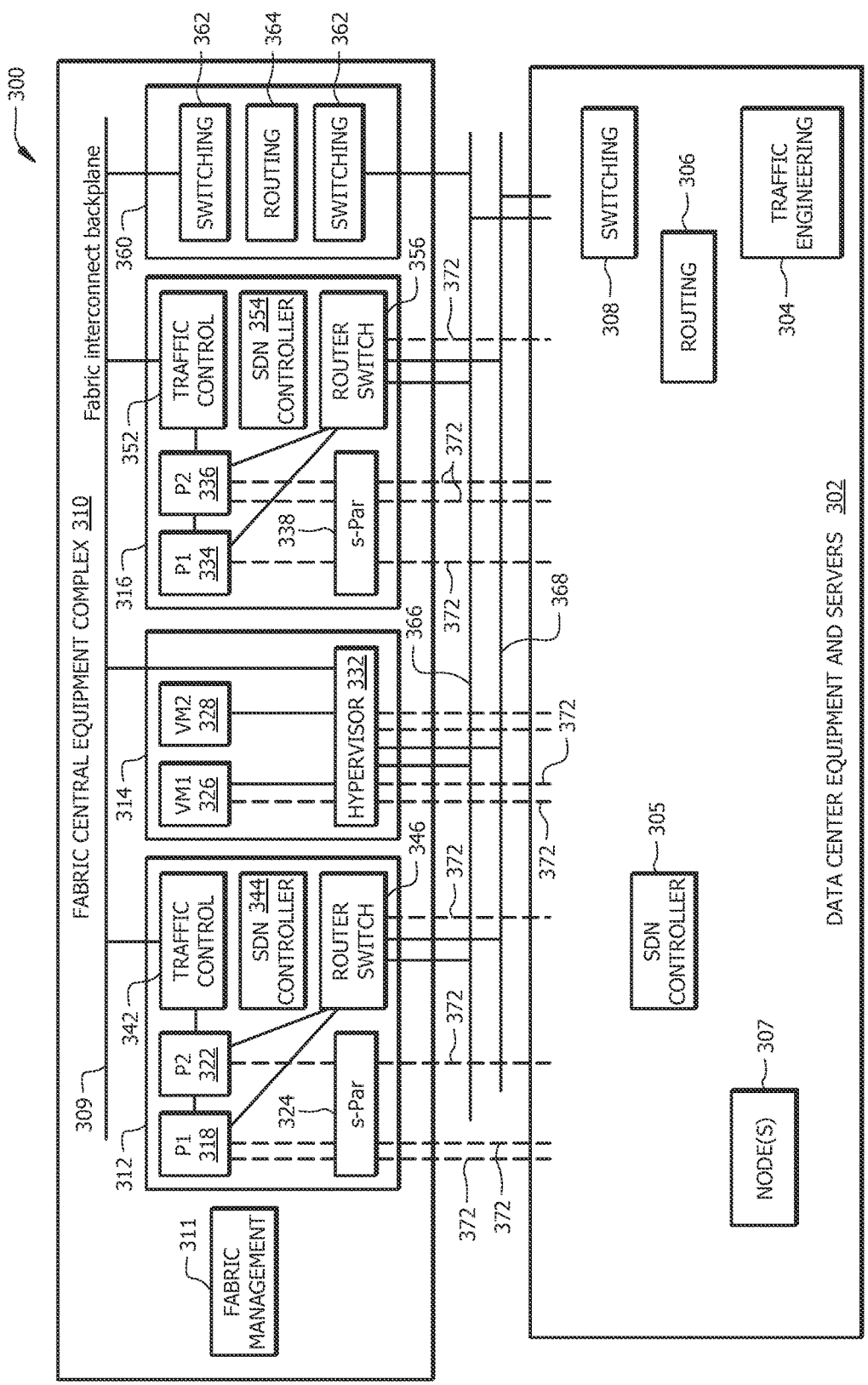
FIG. 6 is a schematic view of a data center, including a Forward Fabric system, according to an embodiment.

FIG. 6 is a schematic view of a data center architecture 300, according to an embodiment. Similar to a conventional data center architecture, such as the conventional data center 200 discussed hereinabove, the data center architecture 300 includes a data center platform 302, which includes the appropriate traffic engineering 304, routing 306 and switching 308 components or systems for proper operation of the data center platform 302. The data center architecture 300 also can include one or more software defined network (SDN) controllers 305 for managing portions of the data center platform 302, as will be discussed in greater detail hereinbelow. The data center architecture 300 also can include one or more nodes 307 that are not part of a Forward Fabric system 310, which will be discussed in greater detail hereinbelow. The data center platform 302 typically is coupled to an appropriate local area network (LAN) (not shown).

However, unlike the plurality of individual nodes coupled to a conventional data center platform, the data center platform 302 in the data center architecture 300 has coupled thereto a Forward Fabric system 310. The Forward Fabric system 310, which typically is a physical fabric that also can be referred to as a fabric central equipment complex, includes a fabric interconnect backplane 309 coupled between the system of nodes within the Forward Fabric system 310. The Forward Fabric system 310 also includes a Forward Fabric manager (FFM) 311 for controlling and managing the Forward Fabric system 310, and for controlling and managing the system of nodes within the Forward Fabric system 310 via the fabric interconnect backplane 309.

For example, the Forward Fabric system 310 includes one or more nodes, e.g., a first node 312, a second node 314 and a third node 316. Each of the nodes can include one or more applications, operating systems, virtual machines, hypervisor applications and secure partition applications installed and/or running therein. For example, the first node 312 can include a first partition (P1) 318, a second partition (P2) 322 and a secure partition (s-Par) application or platform 324 installed and/or running therein. Also, the second node 314 can include a first virtual machine (VM1) 326, a second virtual machine (VM2) 328 and a hypervisor application 332 installed and/or running therein. Also, the third node 316 can include a first partition (P1) 334, a second partition (P2) 336 and a secure partition (s-Par) application or platform 338 installed and/or running therein. It should be understood that one or more of the first, second and third nodes can have installed and/or running therein any one or more of the applications, operating systems, virtual machines, hypervisors, platforms and secure partition (s-Par) applications shown.

According to an embodiment, the first node 312 also includes a traffic control component 342 coupled to one or more of the partitions/platforms within the first node 312, and a router switch component 346 coupled to one or more of the partitions/platforms within the first node 312. According to an embodiment, the traffic control component 342, which can be an interconnect service partition (ICSP), is responsible for accepting and/or interpreting configuration commands from the SDN controller and performing the associated processing necessary to alter the physical network components (e.g., the physical router switches) to implement the desired configuration (e.g., altering configuration files and downloading configuration files into a switch, such as an Infiniband switch.

The router switch component 346, which can be a virtual router switch, typically is hosted in a guest partition within the node. The router switch component 346 performs the functionality of a conventional hardware-based switch entity. For example, in the secure partition (s-Par) environment, the router switch component 346 are useful for guest partitions dedicated to management functions, such as security (e.g., firewall and/or intrusion devices).

The first node 312 also includes an embedded software defined network (SDN) controller 344. In general, a software defined network decouples the network control and forwarding functions of a data system. That is, a software defined network provides for separation of the control plane from the forwarding plane within a data system. Typically, a software defined network includes an SDN controller and an SDN data path network device (not shown). A software defined network also includes one or more programmable SDN applications (not shown) that communicate with the SDN controller. It should be understood that one or more other nodes in the Forward Fabric system 310, e.g., the third node 316, can include a traffic control component 352 coupled to one or more of the platforms within the third node 316, a router switch component 356 coupled to one or more of the platforms within the third node 316, and an embedded software defined network (SDN) controller 354. According to an embodiment, the traffic control component 352 can be an ICSP.

According to an embodiment, the Forward Fabric system 310 also includes a switching and routing node 360, which is configured by the Forward Fabric manager 311. The switching and routing node 360, which can be a virtual defined switch/router, includes one or more switching components 362 and a routing component 364. The switching and routing node 360 provides systems level switching and routing functionality between the nodes within the Forward Fabric system 310. The switching and routing node 360 may include more than one switching component 362 if there is more than one different fabric transport coupled to different types of switches. Also, the switching and routing node 360 can include one or more Infiniband (IB) switches and/or hardware networking components. According to an embodiment, the interconnection between the nodes within the Forward Fabric system 310, via the fabric interconnect backplane 309, can be provided by an Infiniband (IB) switched fabric communications link. In this manner, one or more of the SDN controller 344 and the SDN controller 354 can include an Infiniband Open Subnet manager (IB OpenSM) application that manages IB switches in the IB switched fabric communications link.

Within the Forward Fabric system 310, each of the nodes 312, 314, 316 can be interfaced or interconnected with one or more other nodes and with the switching and routing node 360 via a set of connectivity segments or non-stop fabric segments (shown as segments 366). Also, if desired, each of the nodes 312, 314, 316 can be interfaced or interconnected with the data center platform via a set of connectivity segments or non-stop fabric segments (shown as segments 368). Also, one or more components within one or more of the nodes 312, 314 and 316 within the Forward Fabric system 310 can have optional platform/partition specific (one-off) connections 372 with the data center platform 302.

According to an embodiment, the Forward Fabric system 310, through the use of the fabric interconnect backplane 309, the Forward Fabric manager 311 and the connectivity segments 366, allows the nodes within the Forward Fabric system 310 to communicate with the data center platform 302 via the switching and routing node 360, rather than via a plurality of NICs and HBAs, as is required in conventional data center architectures. In this manner, the use of the fabric interconnect backplane 309, the Forward Fabric manager 311 and the connectivity segments 366, greatly reduces the number of network patch cables, NICs and HBAs between the nodes within the Forward Fabric system 310 and the data center platform 302.

Also, according to an embodiment, the SDN controllers 344, 354 receive secure and non-stop Forward Fabric configuration information to configure instance(s), e.g., OpenSM (InfiniBand compliant Subnet Manager) instance(s), to provide secure and non-stop Forward Fabric endpoints on both the Forward Fabric system 310 and the data center platform 302.

Also, in addition to controlling and managing the Forward Fabric system 310 and the system of nodes within the Forward Fabric system 310, the Forward Fabric manager 311 creates one or more virtual local area networks (vLANs) within the Forward Fabric system 310 and assigns partitions to the appropriate vLANs. A vLAN provides the same functionality between guests that a physical LAN does between physical systems. The Forward Fabric manager 311 also creates at least one virtual data center within the Forward Fabric system 310. A virtual data center provides the same functionality that a conventional data center does in a non-virtualized environment.

Also, having the SDN controllers embedded within the various nodes within the Forward Fabric system 310 provides additional advantages. For example, the embedded SDN controllers reduce the need for application-specific integrated circuit (ASIC) networking devices. Also, the embedded SDN controllers enable control of networks within the Forward Fabric system 310 302 through network elements, thus making it easier to design, deploy, manage and scale networks within the Forward Fabric system 310. This also reduces the overall management time of the networks within the Forward Fabric system 310.

Figure 7:
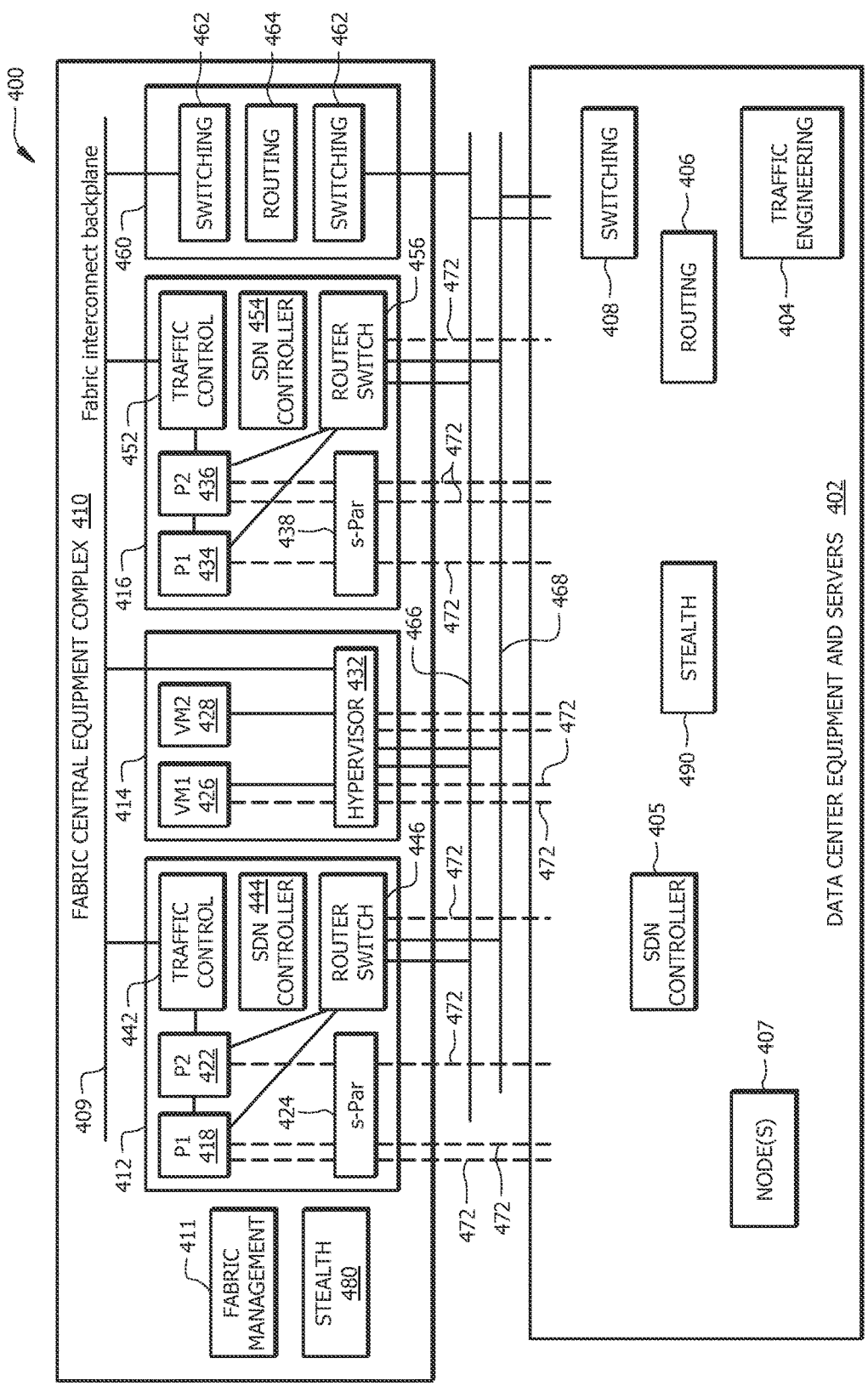
FIG. 7 is a schematic view of an alternative data center, including a Forward Fabric system, according to an embodiment.

FIG. 7 is a schematic view of an alternative data center architecture 400, according to an embodiment. The data center architecture 400 includes a data center platform 402, which includes the appropriate traffic engineering 404, routing 406 and switching 408 components or systems for proper operation of the data center platform 402. The data center architecture 400 also can include one or more software defined network (SDN) controllers 405, as discussed hereinabove. The data center architecture 400 also can include one or more nodes 407 that are not part of a Forward Fabric system 410, as discussed hereinabove. The data center platform 402 typically is coupled to an appropriate local area network (LAN) (not shown).

Similar to the data center architecture 300 shown in FIG. 6, the data center architecture 400 includes a Forward Fabric system 410 coupled to the data center platform 402. The Forward Fabric system 410 includes a fabric interconnect backplane 409 coupled between the system of nodes within the Forward Fabric system 410. The Forward Fabric system 410 also includes a Forward Fabric manager (FFM) 411 for controlling and managing the Forward Fabric system 410, and for controlling and managing the system of nodes within the Forward Fabric system 410 via the fabric interconnect backplane 409.

For example, the Forward Fabric system 410 includes one or more nodes, e.g., a first node 412, a second node 414 and a third node 416. Each of the nodes can include one or more applications, operating systems, virtual machines, hypervisor applications and secure partition applications installed and/or running therein. For example, the first node 412 can include a first partition (P1) 418, a second partition (P2) 422 and a secure partition (s-Par) application or platform 424 installed and/or running therein. Also, the second node 414 can include a first virtual machine (VM1) 426, a second virtual machine (VM2) 428 and a hypervisor application 432 installed and/or running therein. Also, the third node 416 can include a first partition (P1) 434, a second partition (P2) 436 and a secure partition (s-Par) application or platform 438 installed and/or running therein. It should be understood that one or more of the first, second and third nodes can have installed and/or running therein any one or more of the applications, operating systems, virtual machines, hypervisors, platforms and secure partition (s-Par) applications shown.

According to an embodiment, the first node 412 also includes a traffic control component 442 coupled to one or more of the platforms within the first node 412, and a router switch component 446 coupled to one or more of the platforms within the first node 412. According to an embodiment, the traffic control component 442 can be an interconnect service partition (ICSP).

The first node 412 also includes an embedded software defined network (SDN) controller 344. It should be understood that one or more other nodes in the Forward Fabric system 410, e.g., the third node 416, can include a traffic control component 452 (e.g., an ICSP) coupled to one or more of the platforms within the third node 416, a router switch component 456 coupled to one or more of the platforms within the third node 416, and an embedded software defined network (SDN) controller 454.

According to an embodiment, the Forward Fabric system 410 also includes a switching and routing node 460, which is configured by the Forward Fabric manager 411. The switching and routing node 460, which can be a virtual defined switch/router, includes one or more switching components 462 and a routing component 464. The switching and routing node 460 provides systems level switching and routing functionality between the nodes within the Forward Fabric system 410. According to an embodiment, the interconnection between the nodes within the Forward Fabric system 410, via the fabric interconnect backplane 409, can be provided by an Infiniband (IB) switched fabric communications link. In this manner, one or more of the SDN controller 444 and the SDN controller 454 can include an Infiniband Open Subnet manager (IB OpenSM) application that manages IB switches in the IB switched fabric communications link.

Within the Forward Fabric system 410, each of the nodes 412, 414, 416 can be interfaced or interconnected with one or more other nodes and with the switching and routing node 460 via a set of connectivity segments or non-stop fabric segments (shown as segments 466). Also, if desired, each of the nodes 412, 414, 416 can be interfaced or interconnected with the data center platform via a set of connectivity segments or non-stop fabric segments (shown as segments 468). Also, one or more components within one or more of the nodes 412, 414 and 416 within the Forward Fabric system 410 can have optional platform/partition specific (one-off) connections 472 with the data center platform 402.

According to an embodiment, the Forward Fabric system 410, through the use of the fabric interconnect backplane 409, the Forward Fabric manager 411 and the connectivity segments 466, allows the nodes within the Forward Fabric system 410 to communicate with the data center platform 402 via the switching and routing node 460, rather than via a plurality of NICs and HBAs, as is required in conventional data center architectures. In this manner, the use of the fabric interconnect backplane 409, the Forward Fabric manager 411 and the connectivity segments 466, greatly reduces the number of network patch cables, NICs and HBAs between the nodes within the Forward Fabric system 410 and the data center platform 402.

According to an embodiment, for additional security, the Forward Fabric system 410 includes one or more embedded Stealth application components 480. It should be understood that the Stealth application component 480 can be coupled to or part of the embedded software defined network that includes the SDN controllers 444, 454. Alternatively, the Stealth application component 480 can be a separate component embedded within the Forward Fabric system 410 and coupled to the Forward Fabric manager 411 (as shown) and the software defined network that includes the SDN controllers 444, 454.

The embedded Stealth application component 480 includes Stealth technology developed by Unisys Corporation of Blue Bell, Pa. In general, Stealth technology conceals communication endpoints in such a way that makes the endpoints undetectable to unauthorized parties inside and outside of the particular platform in which the Stealth application component resides. Therefore, by embedding the Stealth application component 480 into the Forward Fabric system 410 or within the software defined network (SDN), the communication endpoints of the Forward Fabric system 410 are undetectable from the perspective of the data center platform 402 and any LAN to which the data center platform 402 is coupled.

According to an embodiment, the data center platform 402 also includes one or more Stealth application components 490. Like the Stealth application component 480 within the Forward Fabric system 410, the Stealth application component 490 within the data center platform 402 makes the communication endpoints of the data center platform 402 undetectable from the perspective of the Forward Fabric system 410 and from the perspective of any LANs coupled to the data center platform 402.

In this manner, the Stealth application component 480 provides an additional security level to the Forward Fabric system 410. Similarly, the Stealth application component 490 provides an additional security level to the data center platform 402.

According to an embodiment, the Forward Fabric manager (FFM) 411 can include a virtual or hardware jump box console to the Stealth application component 480. The jump box console allows administrative tasks to be performed under the Stealth environment.

It will be apparent to those skilled in the art that many changes and substitutions can be made to the embodiments described herein without departing from the spirit and scope of the disclosure as defined by the appended claims and their full scope of equivalents.

The invention claimed is:

1. A Forward Fabric system for coupling to a data center platform, the Forward Fabric system comprising:
  a processor;
  a memory coupled to the processor;
  a plurality of nodes, wherein each node includes at least one of one or more applications, operating systems, virtual machines, and hypervisor applications running thereon;
  an interconnect backplane coupled between the plurality of nodes;
  a Forward Fabric Manager (FFM) coupled to the plurality of nodes via the interconnect backplane for controlling and managing the Forward Fabric system; and
  a physical router switch coupled to the Forward Fabric manager and coupled to the plurality of nodes,
  wherein the Forward Fabric manager creates at least one secure partition (s-Par) application executing within at least one of the plurality of nodes,
  wherein at least one of the plurality of nodes having a secure partition (s-Par) application executing therein also includes a software defined network (SDN) controller executing therein for receiving configuration information and providing at least one secure and non-stop Forward Fabric endpoint on the Forward Fabric system for connecting with at least one endpoint on the data center platform,
  wherein at least one of the plurality of nodes having a secure partition (s-Par) application executing therein also includes an interconnect service partition for accepting and interpreting at least one configuration command from the SDN controller and for implementing a configuration based on the configuration command,
  wherein at least one of the plurality of nodes having a secure partition (s-Par) application executing therein also includes a router switch component for performing at least one switching function within the Forward Fabric system,
  wherein at least one of the plurality of nodes is coupled to the data center platform via at least one SDN controller, and
  wherein the at least one SDN controller allows the plurality of nodes to communicate with the data center platform without any network cards and without any host bus adapters.

2. The Forward Fabric system as recited in claim 1, wherein the physical router switch includes a routing component and at least one switching component for providing systems level switching and routing functions within the Forward Fabric system.

3. The Forward Fabric system as recited in claim 1, wherein at least one of the plurality of nodes is coupled to at least one other node via at least one non-stop fabric segment.

4. The Forward Fabric system as recited in claim 1, further comprising a Stealth application component coupled to at least one of the Forward Fabric manager and the SDN controller, wherein the Stealth application component conceals communication endpoints of the Forward Fabric system in such a way that the communication endpoints of the Forward Fabric system are not detectable by the data center platform.

5. The Forward Fabric system as recited in claim 1, wherein at least one of the plurality of nodes includes at least one partition executing therein.

6. The Forward Fabric system as recited in claim 1, wherein at least one of the plurality of nodes includes at least one virtual machine (VM) executing therein.

7. The Forward Fabric system as recited in claim 1, wherein at least one of the plurality of nodes includes a hypervisor executing therein.

8. The Forward Fabric system as recited in claim 1, wherein at least one of the router switch components is an interconnect service partition (ICSP).

9. The Forward Fabric system as recited in claim 1, wherein the Forward Fabric manager creates at least one virtual local area network (vLAN) within the Forward Fabric system and assigns partitions to the at least one virtual local area network.

10. The Forward Fabric system as recited in claim 1, wherein the Forward Fabric manager creates at least one virtual data center within the Forward Fabric system.

11. The Forward Fabric system as recited in claim 1, wherein at least one component within at least one of the plurality of nodes is coupled to the data center platform via a platform/partition specific connection.

12. The Forward Fabric system as recited in claim 1, wherein the secure partition (s-Par) application further comprises a virtualization system for a host computing device having at least one host processor and system resources including memory divided into most privileged system memory and less privileged user memory, the virtualization system including:
  a virtualization ultraboot application that operates in the less privileged user memory and divides the host computing device into a plurality of virtual partitions including at least one user guest partition and at least one system partition, the at least one virtual guest partition, and the at least one system partition maintaining a resource database for use in managing the use of the at least one host processor and the system resources;

at least one monitor that operates in the most privileged system memory and maintains guest applications in the at least one virtual guest partition within memory space allocated by the virtual service partition to the at least one virtual guest partition; and a context switch between the at least one monitor and the respective virtual guest partitions and the virtual service partition for controlling multitask processing in the partitions on the at least one host processor.

13. A Forward Fabric architecture, comprising:

a data center platform;

a Forward Fabric system coupled to the data center, wherein the Forward Fabric includes:

a processor;

a memory coupled to the processor;

a plurality of nodes, wherein each node includes at least one of one or more applications, operating systems, virtual machines, and hypervisor applications running thereon;

an interconnect backplane coupled between the plurality of nodes; and a Forward Fabric Manager (FFM) coupled to the plurality of nodes via the interconnect backplane for controlling and managing the Forward Fabric system; and a physical router switch coupled to the Forward Fabric manager and coupled to the plurality of nodes, wherein the Forward Fabric manager creates at least one secure partition (s-Par) application executing within at least one of the plurality of nodes, wherein at least one of the plurality of nodes having a secure partition (s-Par) application executing therein also includes a software defined network (SDN) controller executing therein for receiving configuration information and providing at least one secure and non-stop Forward Fabric endpoint on the Forward Fabric system for connecting with at least one endpoint on the data center platform, wherein at least one of the plurality of nodes having a secure partition (s-Par) application executing therein also includes an interconnect service partition for accepting and interpreting at least one configuration command from the SDN controller and for implementing a configuration based on the configuration command, wherein at least one of the plurality of nodes having a secure partition (s-Par) application executing therein also includes a router switch component for performing at least one switching function within the Forward Fabric system, wherein at least one of the plurality of nodes is coupled to the data center platform via at least one SDN controller, and wherein the at least one SDN controller allows the plurality of nodes to communicate with the data center platform without any network cards and without any host bus adapters.

14. The Forward Fabric architecture as recited in claim 13, wherein the physical router switch includes a routing component and at least one switching component for providing systems level switching and routing functions within the Forward Fabric system.

15. The Forward Fabric architecture as recited in claim 13, wherein at least one of the plurality of nodes is coupled to at least one other node via at least one non-stop fabric segment.

16. The Forward Fabric architecture as recited in claim 13, further comprising a Stealth application component coupled to at least one of the Forward Fabric manager and the SDN controller, wherein the Stealth application component conceals communication endpoints of the Forward Fabric system in such a way that the communication endpoints of the Forward Fabric system are not detectable by the data center platform.

17. The Forward Fabric architecture as recited in claim 13, wherein the data center platform includes a Stealth application component, wherein the Stealth application component conceals communication endpoints of the data center platform in such a way that the communication endpoints of the data center platform are not detectable by the Forward Fabric system.

18. The Forward Fabric architecture as recited in claim 13, wherein at least one of the router switch components is an interconnect service partition (ICSP).

19. The Forward Fabric architecture as recited in claim 13, wherein at least one component within at least one of the plurality of nodes is coupled to the data center platform via a platform/partition specific connection.

20. The Forward Fabric architecture as recited in claim 13, wherein the secure partition (s-Par) application further comprises a virtualization system for a host computing device having at least one host processor and system resources including memory divided into most privileged system memory and less privileged user memory, the virtualization system including:

a virtualization ultraboot application that operates in the less privileged user memory and divides the host computing device into a plurality of virtual partitions including at least one user guest partition and at least one system partition, the at least one virtual guest partition, and the at least one system partition maintaining a resource database for use in managing the use of the at least one host processor and the system resources;

at least one monitor that operates in the most privileged system memory and maintains guest applications in the at least one virtual guest partition within memory space allocated by the virtual service partition to the at least one virtual guest partition; and a context switch between the at least one monitor and the respective virtual guest partitions and the virtual service partition for controlling multitask processing in the partitions on the at least one host processor.

* * * * *